United States Patent Office 3,816,562
Patented June 11, 1974

3,816,562
STABILIZED POLYPHENYLENE ETHER COMPOSITIONS
Klaus E. Holoch, Roxheim, Pfalz, Germany, and Lester Adrian Doe, Jr., Newtown, Conn., assignors to General Electric Company
No Drawing. Filed Oct. 12, 1971, Ser. No. 188,429
Int. Cl. C08g 43/00, 43/02, 51/60
U.S. Cl. 260—874          8 Claims

ABSTRACT OF THE DISCLOSURE

There are provided stabilized compositions consisting of a major proportion of a thermoplastic resin having a polyphenylene ether component and a minor proportion of a stabilizer consisting of a compound containing at least one P-N bond, combined with an alkanolamine or a mixture thereof with a boron compound. The boron compound can include, carbon and hydrogen, in addition to oxygen.

---

This invention relates to thermoplastic compositions containing polyphenylene ethers and more particularly to the stabilization of such compositions with a stabilizing system selected from compounds containing phosphorus-nitrogen bonds, alone, or in combination with compounds containing boron-oxygen bonds.

BACKGROUND OF THE INVENTION

It is known that the polyphenylene ethers and, particularly, the 2,6-dialkyl substituted polyphenylene ethers, are somewhat unstable under the influence of heat and light, exposure causing the resin to become dark colored, brittle and undesirable for many uses. The causes of the degradation is not fully understood, but is believed to be due, in part, to the presence of hydroxyl groups on the polymer chain, a sensitivity to oxygen containing atmospheres and the degradative effects of traces of impurities present in the resin composition.

The term "polyphenylene ether" includes the polymers disclosed and claimed in Hay, U.S. 3,306,874 and 3,306,875, and in Stamatoff, U.S. 3,257,357 and 3,257,358. They are prepared by the oxidative coupling of a phenolic compound, preferably in an inert solvent and in the presence of a complex catalyst formed from a copper salt and an amine.

Illustrative polyphenylene ethers are members of a family embraced by Formula I:

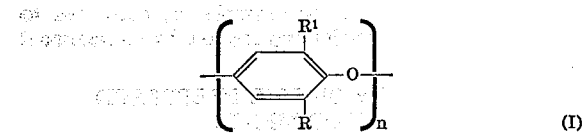

wherein R and $R^1$ are monovalent substituents selected from the group consisting of hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, said radicals being free of a tertiary alpha-carbon atom, and $n$ is a whole integer of at least about 50. Preferably the R and $R^1$ groups will be hydrocarbon alkyl of from 1 to 8 carbon atoms. Especially preferably, R and $R^1$ are each methyl. Such a compound is known as poly(2,6-dimethyl-1,4-phenylene)ether.

The term "thermoplastic resin composition having a normally unstable polyphenylene ether component" contemplates such polyphenylene ethers alone and the various copolymers, interpolymers and blends of polyphenylene ethers formed by interpolymerizing or blending the polyphenylene ethers with other monomers or polymers, such as the polyolefins, polystyrenes, polycarbonates and the like, wherein the polyphenylene ether is present in an amount sufficient to adversely affect the properties of the polymer composition due to the influence of heat and light.

One important such composition comprises a combination of polyphenylene ether and a styrene resin. Such compositions, which possess many of the desirable advantages of both the polyphenylene ether and the styrene resin, are disclosed and claimed in Cizek, U.S. 3,383,435. The most useful thermoplastic resin compositions of this type contain from about 20 to about 80, preferably from about 40 to 60, parts by weight of said polyphenylene ether and from about 80 to about 20, preferably from about 60 to about 40, parts by weight of said polystyrene resin. The styrene resin will in general have at least 25% by weight of the repeating units derived from a monomer having Formula II:

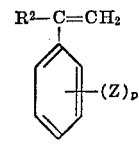
(II)

wherein $R^2$ is hydrogen, (lower)alkyl or halogen, Z is vinyl, halogen or (lower)alkyl; and $p$ is 0 or a whole number of from 1 to 5. Included in this family of resins will be homopolystyrene and polychlorostyrene and rubber modified polystyrenes, and styrene acrylonitrile copolymers, styrene-acrylonitrile-alpha-alkyl styrene terpolymers, styrene-acrylonitrile-butadiene terpolymers, poly-alpha-methylstyrene, copolymers of ethylvinyl benzene and divinyl benzene and the like. The most useful of such compositions are those in which the polystyrene resin component is either homopolystyrene or a rubber modified (blended or grafted) high impact polystyrene, the rubber being, for example, a polybutadiene, polyisoprene or rubbery copolymer of butadiene and styrene. Polyphenylene ether components in such compositions are also known to adversely affect their properties under the influence of heat and light.

Previously, a large number of different compounds such as phenolic antioxidants, e.g., p-phenylphenol, N-stearoyl-p-aminophenol and 2,2'-methylenebis(4-ethyl-6-tert-butylphenol), have been used as heat and light stabilizers for polyphenylene ether compositions. These stabilizers have been generally unsatisfactory for even short exposure to heat. Other stabilizers such as the ketenes, benzoic anhydride and mercaptobenzimidazoles have also been proposed, and have been found to be effective for short periods of exposure to heat, but not for the relatively long exposures required for many commercial uses.

In Zuccaro, U.S. 3,420,792, it is disclosed that the addition of a small amount of a hexaalkylphosphoric triamide is very effective to stabilize polyphenylene ethers, the amounts used ranging between about 0.01 and 10% by weight, based on the weight of the resin. The hexaalkylphosphoric triamides are represented by Formula III:

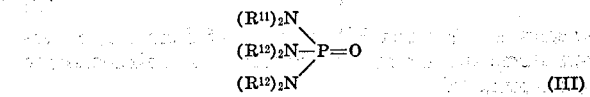
(III)

wherein $R^{11}$, $R^{12}$ and $R^{13}$ are alkyl of from 1 to 6 carbon atoms, e.g., straight chain or branched, methyl, ethyl, propyl, i-propyl, butyl, hexyl and the like. The hexaalkylphosphoric triamides can be made in known ways, e.g., by reaction of a secondary amine with phosphorus oxychloride. Suitable such compounds are hexamethylphosphoric triamide, hexaethylphosphoric triamide, tris(methylethyl)

phosphoric amide, hexa(hexyl)phosphoric triamide, and the like. The preferred embodiment is hexamethylphosphoric triamide.

It has now been discovered that if other compounds containing a phosphorus-nitrogen bond are substituted for hexaalkylphosphoric triamides, or if certain boron containing compounds are added to the hexaalkylphosphoric triamides, or to the compounds substituted therefore, or if an adduct is formed between the hexaalkylphosphoric triamide, a phosphorus compound and a boron compound, stabilizing systems with very high efficiency are obtained. In particular, such novel stabilizers used in combination with a thermoplastic resin having a polyphenylene ether component result in a composition having a much greater stability to heat and light as exemplified by an increase in time to embrittlement of at least 100% as compared to a polyphenylene ether containing only a hexaalkylphosphoric triamide. In addition to the increase in flex life, such compositions provide economic advantages not possible with the prior art stabilizing systems.

DESCRIPTION OF THE INVENTION

According to this invention there are provided stabilized compositions comprising a major amount of a thermoplastic resin composition having a normally unstable polyphenylene ether component and a stabilizing amount of a stabilizer selected from:

(i) A hexaalkylphosphoric triamide and a minor proportion of a trialkanolamine or a mixture thereof with a minor proportion of a boron compound.

The boron compounds used as components in the above stabilizer compositions can vary widely, and will include both organic and inorganic boron compounds. Illustrative of the most useful are (a) boron oxide, $B_2O_3$;
(b) a boronic acid of the formula

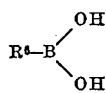

wherein $R^6$ is hydrogen, alkyl of from 1 to 15 carbon atoms or mono-cyclic aryl; or (c) a trialkyl borate of the formula $$(R^7O)_3B$$

wherein $R^7$ is alkyl of from 1 to 15 carbon atoms, or boric acid, $H_3BO_3$.

Illustrative boron acids are boric acid, boronic acid, methylboronic acid, ethylboronic acid, butylboronic acid, hexylboronic acid, phenylboronic acid, methylphenylboronic acid, xylylboronic acid, 2,2'-dimethylheptylboronic acid, 2-methyl-3-ethyloctylboronic acid and the like. Illustrative alkyl borates are trimethyl borate, triethyl borate, triisopropyl borate, tri-2-ethylhexyl borate, and the like.

According to this invention, there are provided compositions comprising a major amount of a thermoplastic resin composition having a normally unstable polyphenylene ether component and a stabilizing amount of a stabilizer comprising a hexaalkylphosphoric triamide of Formula III:

wherein $R^{11}$, $R^{12}$ and $R^{13}$ are alkyl of from 1 to 6 carbon atoms and a minor proportion of a trialkanolamine of Formula IV:

wherein $R^{14}$, $R^{15}$ and $R^{16}$ are divalent alkylene groups of from 2 to 6 carbon atoms, or a mixture thereof with a minor proportion of a boron compound, e.g., boron oxide, a boronic acid, a trialkyl borate, or boric acid, as illustrated above.

Such a system serves also to "cap" the polymer on extrusion. In addition the system increases the time to embrittlement 4- to 5-fold in polyphenylene ether films. To "cap" means to place a terminal group on the polyphenylene ether.

Suitable hexaalkylphosphoric triamides (III) are illustrated hereinabove. The trialkanolamines of Formula IV are commercially available or can be made in known ways, e.g., by the reaction of an ammonia with an alkylene oxide or with the corresponding halogenated alcohol. Illustrative trialkanolamines are triethanolamine, triisopropanolamine, tributanolamine and trihexanolamine. Especially preferred is such a stabilized composition comprising poly(2,6-dimethyl - 1,4 - phenylene)ether, hexamethylphosphoric triamide, triethanolamine and, optionally, but preferably, boron oxide.

The stabilizer may be added in an amount of between about 0.1 and about 10% by weight, calculated on the resin, and preferably in an amount of between 1.0 and 8.0% by weight calculated on the resin.

With respect to stabilizer combinations, in general, the useful and preferred ranges of amount will be as above-stated. The phosphorus-nitrogen bond-containing compound III should be added in an amount at least equal to the remaining components in the stabilizer combination and preferably in an amount equivalent to at least 1.5 times the remaining ingredients in the stabilizer portion of the composition. In preferred such embodiments the phosphorus-nitrogen compound III is present in an amount ranging from 1.0 to 3.0% by weight, the boron compound, if present, is in an amount ranging between 1.0 and 2.0% by weight, the trialkanolamine is in an amount ranging between 1.0 and 2.0% by weight, and any other components will comprise from about 0 to 0.5% by weight, all calculated on the resin content.

The manner of adding the stabilizer to the thermoplastic resin composition containing a polyphenylene ether component is not critical to this invention. Hence, any convenient method can be employed. For example, the stabilizer composition can be blended with the powdered thermoplastic resin composition in a blender, e.g., a Waring-type Blender. Alternatively, the resin can be dissolved in a suitable solvent and the stabilizer added to the solution. The stabilized composition can then be recovered, e.g., by precipitation, or by evaporation of the solvent.

The stabilized compositions of this invention are useful for all purposes for which polyphenylene ether compositions have heretofore been used, see, for example, the above-mentioned patents of Hay and Cizek. The stabilized compositions may, for example, be converted to films, fibers, molded articles and the like by conventional methods.

DESCRIPTION OF THE PREFERRED EMBODIMENTS

The following examples serve to illustrate the invention but are not intended to be limiting. Amounts specified in parts are parts by weight.

The following general Procedure A illustrates a process for the formation of a composition including a polyphenylene ether containing stabilizers according to this invention. In addition, it describes the method for evaluating the stabilized compositions and for comparing them with control samples, which omit certain of the stabilizing components.

PROCEDURE A

Resin, in powdered form, and the selected stabilizer are blended together in a Waring Blender for from 1 to 2 minutes. The mixture is then fed to an extruder and extruded at 500–600° F. (for polyphenylene ether alone)

or at 425–500° F. (for polyphenylene ether blended with a polystyrene resin). The extruded strands are chopped into pellets. Two gram samples of the pellets are molded into specimen films by preheating at 500° F. and thereafter molding at a pressure of 20,000 p.s.i. at a temperature of 550° F. for 1 minute. The films so prepared have a thickness of about 10 mils. They are cut into strip specimens, measuring 4" x ½" and placed in an air circulating oven, maintained at an elevated temperature. The time to embrittle is measured for each of the specimens by folding the films at various times during the heat aging process until the film strip embrittles to a point where it snaps when partially folded. This time is defined as the time to embrittle.

EXAMPLE

The polyphenylene ether used in this example is poly (2,6-methyl-1,4-phenylene)ether. Heat aging is conducted at 175° C. The stabilized compositions and times to embrittle are set out in Table 1.

TABLE 1.—POLYPHENYLENE ETHER COMPOSITION STABILIZED WITH HEXAALKYLPHOSPHORIC TRIAMIDE AND TRIALKANOLAMINE

| Example | Composition | Parts | Time to embrittle (hrs.) |
|---|---|---|---|
| 1-C-1 | Poly(2,6-dimethyl-1,4-phenylene) ether—control (no additive). | 100 | 30 |
| 1-C-2 | Poly(2,6-dimethyl-1,4-phenylene)ether | 100 | 60 |
|  | Hexamethyl phosphoric triamide | 2 |  |
| 1 | Poly(2,6-dimethyl-1,4-phenylene)ether | 100 | 170 |
|  | Hexamethylphosphoric triamide | 2 |  |
|  | Triethanolamine | 1 |  |
|  | Boron oxide | 1 |  |

The extruded pellets according to this invention (1) have a low hydroxyl content of 0.007 wt. percent, whereas the control (1–C–1) has a high hydroxyl content of 0.062 wt. percent. This indicates that the polyphenylene ether end groups have been "capped," i.e., reacted and stabilized.

The procedure is repeated, respectively, omitting the boron oxide, and substituting for boron oxide, boronic acid, triethyl borate and boric acid. The procedure is repeated, substituting for triethanolamine, tri-isopropanolamine; and for the hexamethylphosphoric triamide, hexaethylphosphoric triamide. Stabilized compositions according to this invention are obtained.

The procedures outlined above are repeated, substituting the following for poly(2,6-dimethyl-1,4-phenylene) ether:

poly(2,6-diethyl-1,4-phenylene)ether
poly(2-methyl-6-ethyl-1,4-phenylene)ether
poly(2-methyl-6-propyl-1,4-phenylene)ether
poly(2,6-dipropyl-1,4-phenylene)ether and
poly(2,6-diphenyl-1,4-phenylene)ether.

Stabilized compositions according to this invention are obtained.

The procedures outlined above are repeated, substituting for the poly(2,6 - dimethyl-1,4-phenylene)ether, the following thermoplastic resin compositions (Cizek, U.S. 3,383,435):

Composition: Parts
Poly(2,6-dimethyl-1,4-phenylene)ether _____ 50
Homopolystyrene _____ 50

Poly(2,6-dimethyl-1,4-phenylene)ether _____ 50
High impact rubber modified polystyrene (10% by weight polybutadiene) _____ 50

Poly(2,6-dimethyl-1,4-phenylene)ether _____ 50
Poly(alpha-methyl styrene) _____ 50

Poly(2,6-dimethyl-1,4-phenylene)ether _____ 50
Styrene-acrylonitrile copolymer (27% ACN) ___ 50

Stabilized compositions according to this invention are obtained.

Other modifications and variations of the present invention are possible in light of the above teachings. The compositions may also include various fillers, reinforcements, i.e., fibrous glass, modifying agents, dyes, pigments, plasticizers and the like. It is therefore to be understood that changes may be made in the particular embodiments of the invention described and these will be within the full intended scope of the invention as defined by the appended claims.

What is claimed is:

1. A stabilized composition having increased flex life after exposure to heat and air, said composition comprising a major amount of a thermoplastic resin composition comprising a normally unstable polyphenylene ether of the formula

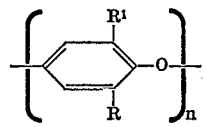

wherein R and $R^1$ are monovalent substituents selected from the group consisting of hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, said radicals being free of a tertiary alpha-carbon atom, and $n$ is a whole integer of at least about 50 and a stabilizing amount of a stabilizer comprising a hexaalkylphosphoric triamide of the formula

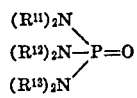

wherein $R^{11}$, $R^{12}$ and $R^{13}$ are alkyl of from 1 to 6 carbon atoms and a minor proportion of a trialkanolamine of the formula

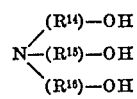

wherein $R^{14}$, $R^{15}$ and $R^{16}$ are divalent alkylene groups of from 2 to 6 carbon atoms, or a mixture thereof with a minor proportion of a boron compound selected from (a) boron oxide,
(b) a boronic acid of the formula

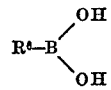

wherein $R^6$ is hydrogen, alkyl of from 1 to 15 carbon atoms or monocyclic aryl,
(c) a trialkyl borate of the formula

wherein $R^7$ is alkyl of from 1 to 15 carbon atoms, or
(d) boric acid, $H_3BO_3$.

2. A composition as defined in claim 1 wherein said polyphenylene ether is poly(2,6-dimethyl - 1,4 - phenylene)ether, said triamide is hexamethylphosphoric triamide, said trialkanolamine is triethanolamine, and said boron compound is boron oxide.

3. A composition as defined in claim 1 wherein R and $R_1$ are each methyl.

4. A composition as defined in claim 1 wherein said thermoplastic resin composition also includes a polystyrene resin having at least 25% by weight of the repeating units derived from the monomer having the formula:

wherein $R^2$ is hydrogen, (lower)alkyl or halogen, Z is vinyl, halogen or (lower)alkyl; and $p$ is 0 or a whole number of from 1 to 5.

5. A composition as defined in claim 4 wherein said thermoplastic resin composition contains from about 20 to about 80 parts by weight of said polyphenylene ether and from about 80 to about 20 parts by weight of said polystyrene resin.

6. A composition as defined in claim 4 wherein said polystyrene resin is homopolystyrene.

7. A composition as defined in claim 4 wherein said polystyrene resin is a rubber modified high impact polystyrene.

8. A stabilized composition as defined in claim 1 wherein the stabilizer constitutes from about 0.1 to about 10.0% by weight of the composition, based on the weight of said resin.

References Cited
UNITED STATES PATENTS

| | | | |
|---|---|---|---|
| 2,287,188 | 6/1942 | Matheson | 260—45.9 R |
| 3,453,231 | 7/1969 | Bussink et al. | 260—874 |
| 3,563,934 | 2/1971 | Burnett | 260—45.9 R |

JOHN C. BLEUTGE, Primary Examiner

J. ZIEGLER, Assistant Examiner

U.S. Cl. X.R.

260—45.7 R, P; 45.9 P, 876 R, 878 R, 879, 881, 886